United States Patent [19]

Imanaka et al.

[11] Patent Number: 4,744,074
[45] Date of Patent: May 10, 1988

[54] DISK-TYPE RECORDING MEDIUM

[75] Inventors: Ryoichi Imanaka, Hirakata; Masatsugu Tanji, Moriguchi, both of Japan

[73] Assignee: Matsushita Electric Industrial Co., Ltd., Osaka, Japan

[21] Appl. No.: 862,223

[22] PCT Filed: Sep. 2, 1985

[86] PCT No.: PCT/JP85/00488
  § 371 Date: Apr. 30, 1986
  § 102(e) Date: Apr. 30, 1986

[87] PCT Pub. No.: WO86/01630
  PCT Pub. Date: Mar. 13, 1986

[30] Foreign Application Priority Data

Sep. 4, 1984 [JP] Japan .................. 59-185503

[51] Int. Cl.$^4$ .............................................. G11B 7/24
[52] U.S. Cl. ...................... 369/278; 369/280
[58] Field of Search ............... 369/280, 279, 278, 277

[56] References Cited

FOREIGN PATENT DOCUMENTS

| 2066017 | 7/1979 | Fed. Rep. of Germany . |
| 57-103136 | 6/1982 | Japan . |
| 58-12149 | 1/1983 | Japan . |
| 58-32239 | 2/1983 | Japan . |
| 58-128043 | 6/1983 | Japan . |
| 58-102347 | 6/1983 | Japan . |
| 59-30252 | 2/1984 | Japan . |
| 2018489 | 10/1979 | United Kingdom . |

Primary Examiner—Steven L. Stephan
Attorney, Agent, or Firm—Wenderoth, Lind & Ponack

[57] ABSTRACT

A disk-type recording medium having circular or spiral tracks storing information. The tracks are radially and regularly spaced from one another. Each track has pregrooves (2), ridges, or protrusions, and discrete depressions (7,9), ridges, or protrusions. The depressions (7,9) are so disposed that the depressions of neighboring tracks do not neighbor one another. In playback, the depressions (7,9) of neighboring tracks do not cause crosstalk. Thus, the disk permits the identifying signals to be stably and correctly reproduced.

4 Claims, 4 Drawing Sheets

FIG. 5
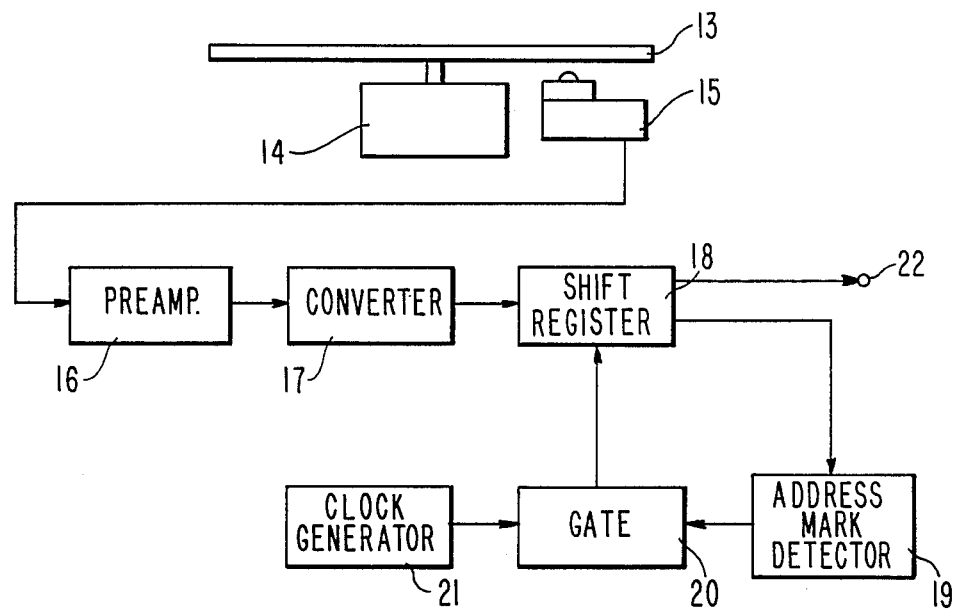
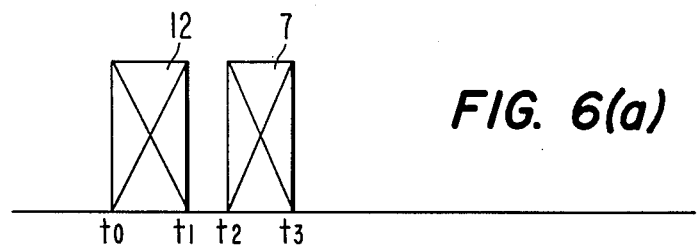
FIG. 6(a)
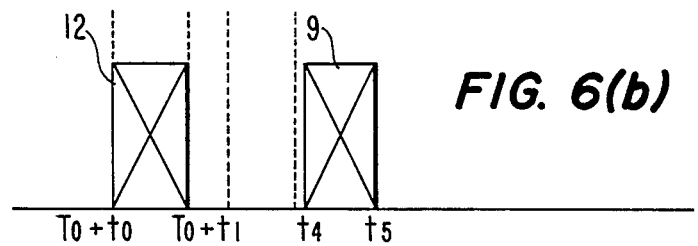
FIG. 6(b)

DISK-TYPE RECORDING MEDIUM

TECHNICAL FIELD

The present invention relates to the structure of information storage tracks on a disk-type recording medium (hereinafter simply referred to as a "disk") and, more particularly, to the organization of depressions corresponding to address signals or other identifying signals and pregrooves preceding the depressions on a recordable disk.

BACKGROUND ART

A currently available disk that is used with a disk player for recording and playing back information with a light beam is fabricated as follows. First, pregrooves that act as storage tracks are formed. Then, identifying signals, such as address signals indicative of the addresses of the pregrooves, are recorded in the pregrooves in the form of ridges, depressions, or reflectivity variations. This conventional recordable disk is described further detail with reference to FIG. 1.

Referring to FIG. 1, the aforementioned disk that allows information to be written onto, or read from, the disk is indicated by numeral 1. Tracks P storing information are so formed on the disk that they lie in circles or spirals around the center of the disk. The circles or spirals are uniformly spaced from one another. Pregrooves 2 are formed along the tracks P. Address signals indicating the addresses of the pregrooves 2 are recorded in the form of discrerte depressions 3 or ridges in the pregrooves, one depression 3 per turn of pregroove 2. Some depressions 3 are also shown in FIG. 1 on an enlarged scale.

The pregrooves 2 are generally radially spaced about 1.6 microns from one another. The pregrooves 2 have a width of about 0.7 micron and a height of about 0.8 micron. Although the pregrooves 2 are shown to be microscopic depressions, microscopic ridges or protrusions may be formed instead.

FIG. 2 shows the pits corresponding to signals and the depressions corresponding to address signals on an enlarged scale, the pits being recorded in the pregrooves 2 of the storage tracks $P_1$–$P_3$. The pits, indicated by numeral 4, corresponding to the signals are formed by illuminating the disk with a laser beam while rotating the disk 1. The laser beam is modulated with a signal to be recorded. The surfaces in the pregrooves which store information are made to exhibit variations in the reflectivity, for example, by the formation of the pits 4. The depressions 3 corresponding to address signals are discrete similarly to the pregrooves. Also, ridges or protrusions may be formed instead of the depressions 3. The pits 4 and depressions 3 are read by a laser beam 5 focused on the disk. Since the pits 4 are substantially narrower than the depressions 3, when any one track of the pregrooves 2, for example, the pits 4 formed in the pregrooves $P_2$, is read, it is hardly likely that the laser beam 5 will hit the pits 4 in a neighboring track $P_1$ or $P_3$. Hence, the level of crosstalk which is produced between neighboring pregrooves and which is introduced into the reproduced signals is not so high as to present problems. However, the depressions 3 corresponding to address signals have a larger width. Therefore, it is very likely that the laser beam 5 will strike the depressions of neighboring tracks. Another problem arises from the fact that a considerable amount of crosstalk is produced, because address signals are recorded on the disk as changed in geometrical shape, such as depressions or ridges. For these reasons, the conventional disk has posed some problems. That is, in the conventional recordable disk, the depressions 3 corresponding to address signals are formed in neighboring positions on the storage tracks on the disk 1 and, therefore, crosstalk is always produced between the depressions 3 in neighboring tracks. This crosstalk increases the amount of noise contained in the reproduced address signal, i.e., the signal-to-noise ratio deteriorates. As a result, a large quantity of error is produced in reading information. This has created a great problem when the recordable disk is used.

DISCLOSURE OF INVENTION

It is the object of the present invention to provide a disk-type recording medium which permits only a greatly reduced amount of crosstalk to occur between identifying signals such as address signals, thereby enabling stable reproduction of the identifying signals. In a disk-type recording medium fabricated in accordance with the present invention, tracks storing information are formed at regular intervals around the center of the disk. Each track has pregrooves and discrete depressions corresponding to identifying signals. Instead, ridges and discrete protrusions may be formed. Pits corresponding to signals are formed in the pregrooves. This medium is characterized in that the depressions corresponding to identifying signals are so located in the tracks that the depressions of any one track do not neighbor the depressions of the neighboring tracks.

When the recording medium constructed as described above is played back, the laser beam used for the playback does not fall on the depressions of two or more neighboring tracks simultaneously. therefore, no crosstalk is produced between the depressions of neighboring tracks. Consequently, identifying signals such as address signals can be stably reproduced.

BRIEF DESCRIPTION OF DRAWINGS

FIG. 5 is a block diagram of a means for detecting address signals;

FIGS. 6(a) and 6(b) are waveform charts for showing the time during which address signals are reproduced from a disk according to the invention.

BEST MODE FOR CARRYING OUT THE INVENTION

Figure 3:
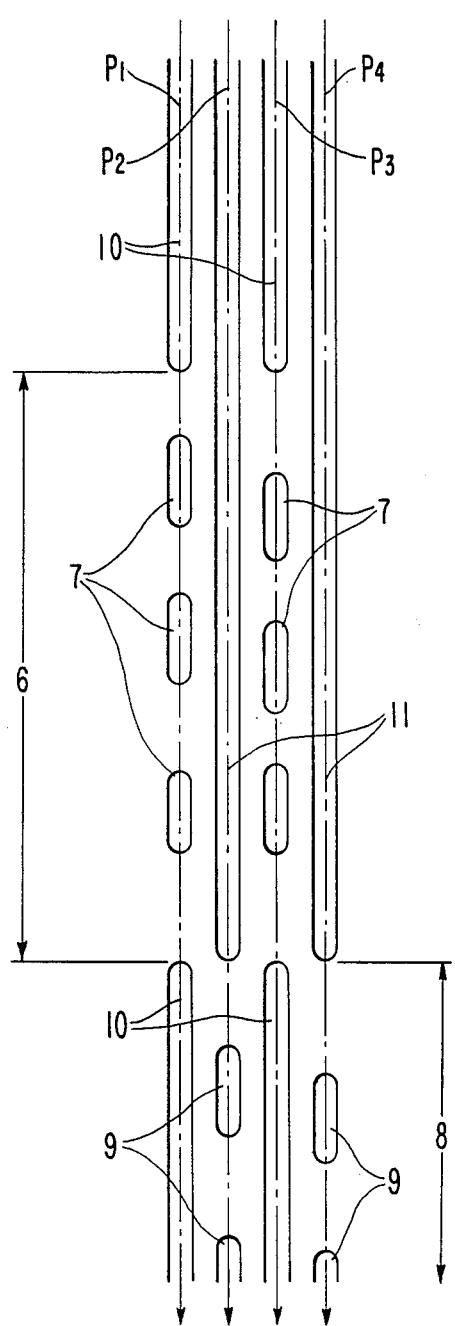
FIG. 3 is a schematic, enlarged plan view of pregrooves and depressions formed on a disk according to the invention.

Referring to FIG. 3, there is shown a portion of a disk according to the present invention. This disk has tracks $P_1$, $P_2$, $P_3$, and $P_4$ storing information. The track $P_1$ has depressions 7 corresponding to an address signal in a section 6. The next track $P_2$ has depressions 8 corresponding to an address signal in a section 8. Similarly, the next track $P_3$ has depressions 6 corresponding to an address signal in the section 6. The track $P_4$ has depressions 9 corresponding to an address signal in the section 8. The tracks $P_1$ and $P_3$ have pregrooves 10. The tracks $P_2$ and $P_4$ have pregrooves 11. Thus, the depressions 7 and 9 of neighboring tracks are so located that they do not lie directly adjacent each other on this disk.

Figure 2:
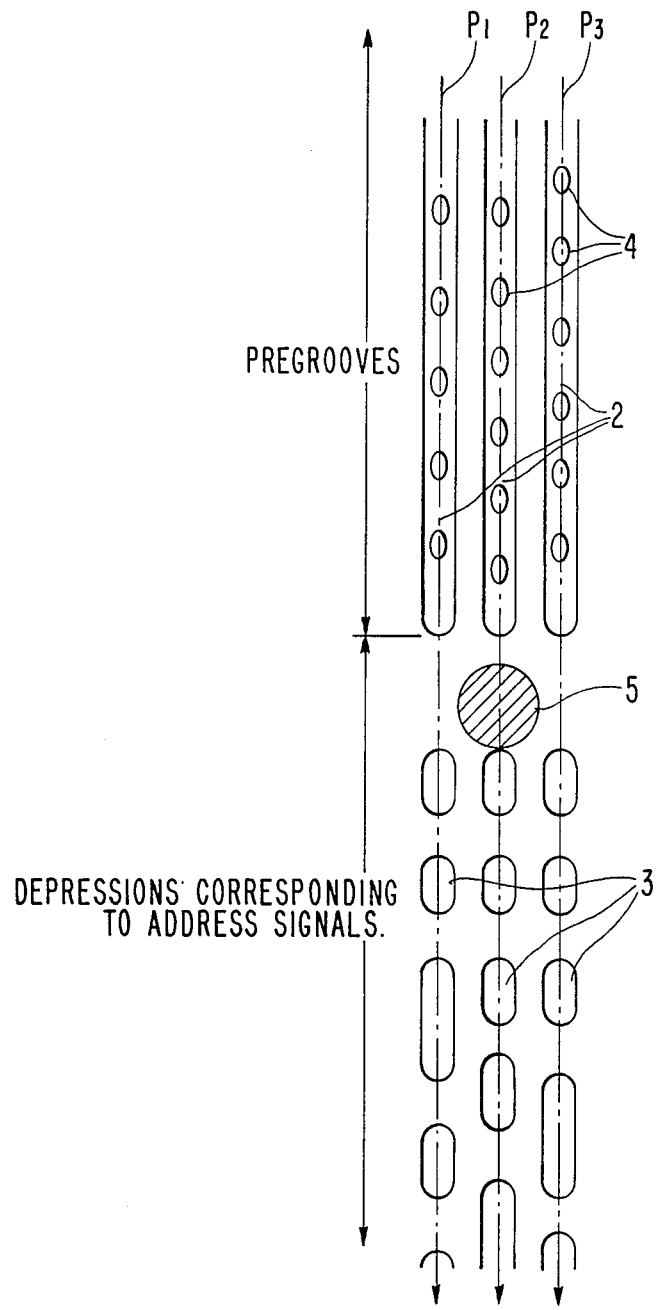
FIG. 2 is a schematic, enlarged plan view of the pregrooves and the depressions corresponding to address signals on the conventional disk shown in FIG. 1.

In the past, as shown in FIG. 2, when the depressions formed in the track $P_2$ and corresponding to an address signal were read out, the resulting signal would have been affected by address signals reproduced from the tracks $P_1$ and $P_3$, i.e., crosstalk would have occurred between them. However, in the novel structure shown in FIG. 3, those which neighbor the depressions 9 and in the tracks, e.g., track $P_2$, are only the pregrooves 10 of the neighboring tracks $P_1$ and $P_3$. When information is read from the disk, no crosstalk takes place between the address signals reproduced from the depressions 7 and 9.

Figure 4:
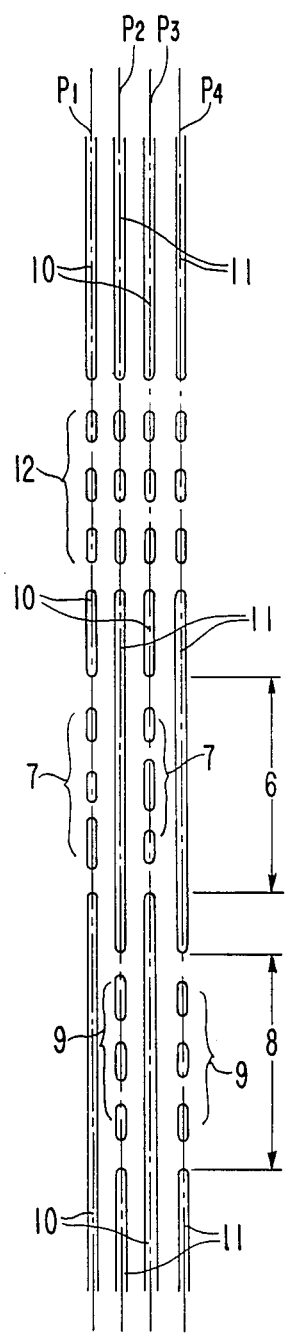
FIG. 4 is a schematic, enlarged plan view of the address marks and depressions formed on the disk according to another disk according to the invention.

Referring next to FIG. 4, there is shown a portion of another disk according to the invention. This disk also has tracks $P_1$–$P_4$ storing information. The tracks $P_1$ and $P_3$ have pregrooves 10. The tracks $P_2$ and $P_4$ have pregrooves 11. Each track has address marks 12 which precede depressions 7 or 9 and corresponding to address signals to indicate the existence of these depressions beforehand. Since address mark signals are recorded in the address marks 12 on the tracks $P_1$–$P_4$ in a common signal format, the address marks 12 can be read even if crosstalk occurs during playback. Therefore, the tracks $P_1$–$P_4$ are so located as to neighbor one another. Also, the address marks 12 neighbor one another, because they are disposed in given positions in the tracks $P_1$–$P_4$ to foretell the positions of the depressions 7 and 9.

FIG. 5 is a block diagram of a circuit for detecting the depressions 7 and 9 corresponding to address signals when the disk having the depressions 7 and 9 shown in FIG. 4 is played back. The recordable disk having grooves and depressions storing information as shown in FIG. 4 is indicated by numeral 13. The disk 13 is rotated by an electric motor 14. An optical head 15 makes use of a laser beam to record information in the pregrooves in the tracks of the disk and to read the previously formed depressions 7, 9, the address marks 12, as well as the pits in the recorded pregrooves 10, 11 corresponding to signals. A preamplifier 16 amplifies the output signal from the head 15 after separating address signals from address mark signals. A converter 17 shapes the waveform of the output from the preamplifier 16 at a certain level and converts it into a two-value signal. A shift register 18 has a capacity sufficient to hold an amount of data beginning with the foremost address mark 12 and ending with the rearmost depression 9. The output of the register 18 is connected to an address mark detector 19. When any address mark 12 is detected, the detector 19 controls a gate 20 in such a way that the output signal from a clock generator 21 is cut off. Thus, addresses 7 and 9 are held in those portions of the shift register 18 which are close to its input terminal, the held addresses appearing at an output terminal 22.

FIG. 6 is a timing chart of waveforms obtained by reading the depressions 7, 9 and the address marks 12 from the tracks on the disk shown in FIG. 4. When the tracks $P_1$ and $P_3$ are read, waveforms shown in FIG. 6($a$) are derived. An address mark signal corresponding to one address mark 12 is reproduced from instant $t_0$ to $t_1$. An address mark signal corresponding to one address mark 7 is reproduced from instant $t_2$ to $t_3$. After the disk makes one revolution in time $T_0$, the tracks $P_2$ and $P_4$ are read. The waveforms of the resulting signals are shown in FIG. 6($b$). An address mark signal corresponding to one address mark 12 is reproduced from instant ($T_0+t_0$) to ($T_0+t_1$). An address mark signal corresponding to one address mark 9 is reproduced from instant $t_4$ to $t_5$.

Figure 1:
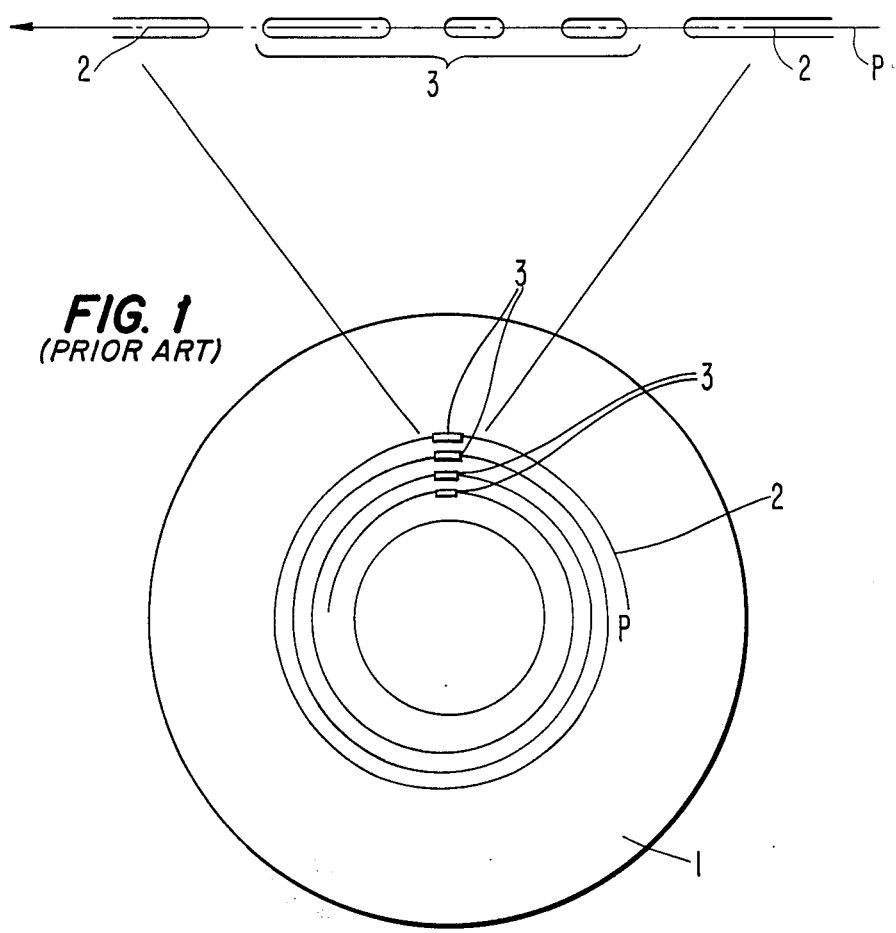
FIG. 1 is a schematic plan view of a conventional, recordable disk, also showing a portion of the disk on an enlarged scale.
Figure 7:
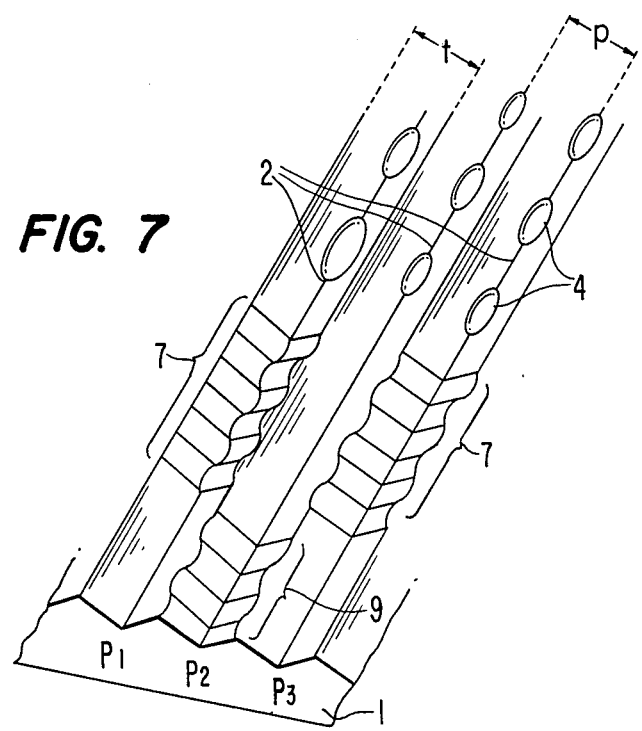
FIG. 7 is a schematic, enlarged perspective view of main portions of another disk according to the invention.

Referring to FIG. 7, there is shown a portion of a further disk 1 according to the invention. The disk 1 has V-shaped pregrooves 2. Since the interval or pitch p between successive tracks is equal to the width t of the tracks, geometrical variations 7 and 9 corresponding to address signals are formed with the same width as the pitch p between the tracks. In the conventional disk, geometrical variations or features of neighboring tracks neighbor each other, producing a very large amount of crosstalk. This has made it almost impossible to put the conventional disk into practical use. In contrast, in the novel disk shown in FIG. 7, the geometrical variations 7 and 9 of neighboring tracks are so disposed that they do not neighbor each other. Hence, no crosstalk is produced. Consequently, the disk can be put into practical use. The disk master is fabricated by forming the V-shaped pregrooves 2 by mechanical cutting. The geometrical variations 7 and 9 corresponding to address signals are formed by changing the depth or height of the pregrooves 2.

INDUSTRIAL APPLICABILITY

As described thus far, in accordance with the present invention, address signals indicating the addresses of neighboring tracks or pregrooves are so recorded on a disk that they do not neighbor one another. Therefore, when the address signals are read, no crosstalk is produced, and address signals can be obtained very stably. Consequently, every item of information recorded on the disk can be stably distinguished. Also, even if the disk tilts radially, no crosstalk is generated. This permits the use of disk whose surfaces make in a wavy motion.

We claim:

1. A disk-type recording medium, comprising a disk having curved tracks thereon around the center thereof which are radially regularly spaced from one another for storing information thereon, each track having elongated information storage pregrooves, ridges or protrusions therealong and having identifying signal depressions, ridges or protrusions therealong, the information storage pregrooves, ridges or protrusions having changed condition portions corresponding to information signals, and the discrete identifying signal depressions, ridges or protrusions being disposed along the tracks at positions other than positions neighboring the identifying signal depressions, ridges or protrusions on adjacent tracks, and which positions further neighbor information storage pregrooves, ridges or protrusions on adjacent tracks.

2. A disk-type recording medium as claimed in claim 1 in which the discrete identifying signal depressions, ridges or protrusions are wider than the changed condition portions in said information storage pregrooves, ridges or protrusions.

3. A disk-type recording medium as claimed in claim 1 in which said tracks further have mark signal geometrical variations therealong at positions preceding the discrete identifying signal depressions, ridges or protrusions.

4. A disk-type recording medium as claimed in claim 1 in which said pregrooves are V-shaped grooves.

* * * * *